Patented Oct. 30, 1945

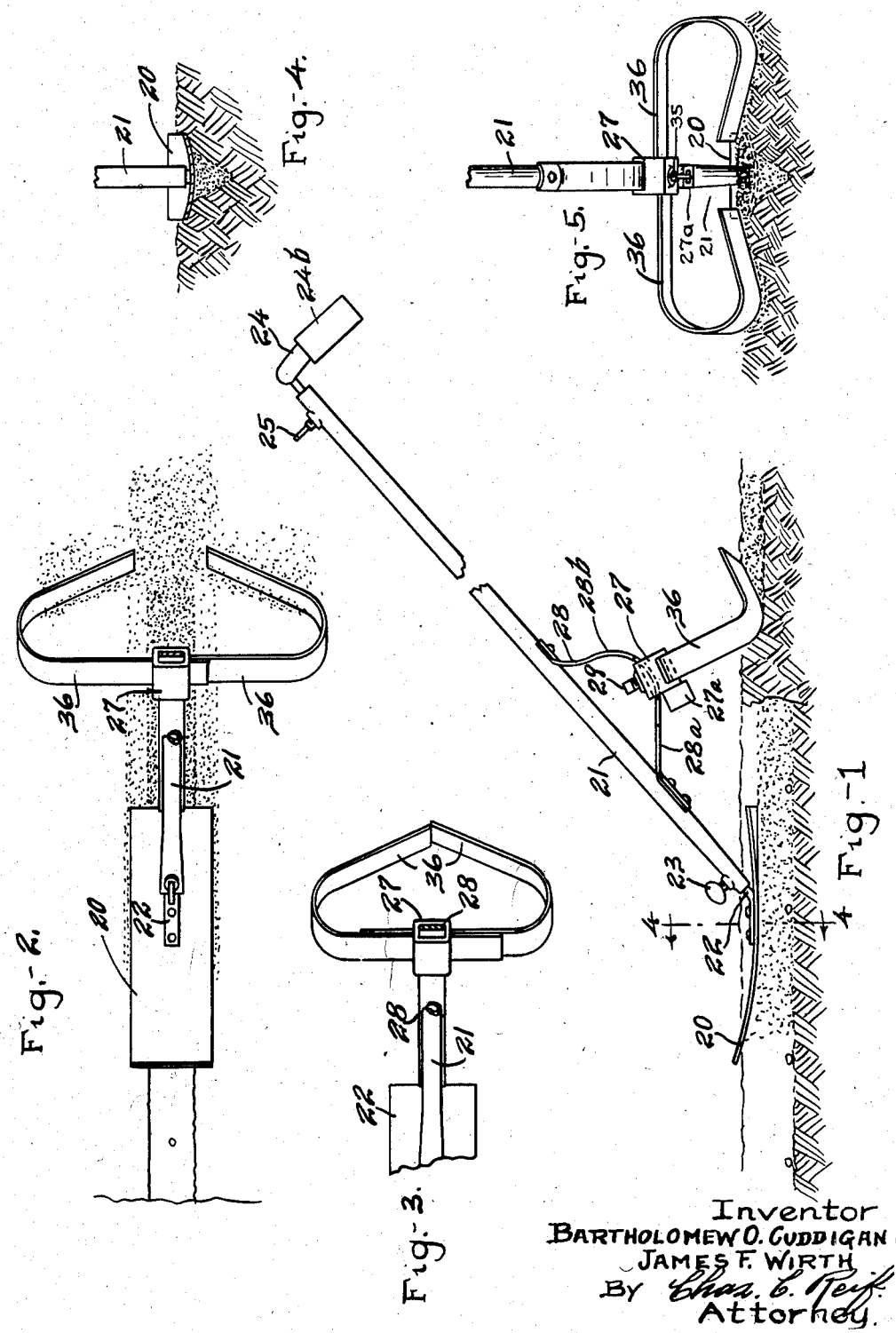

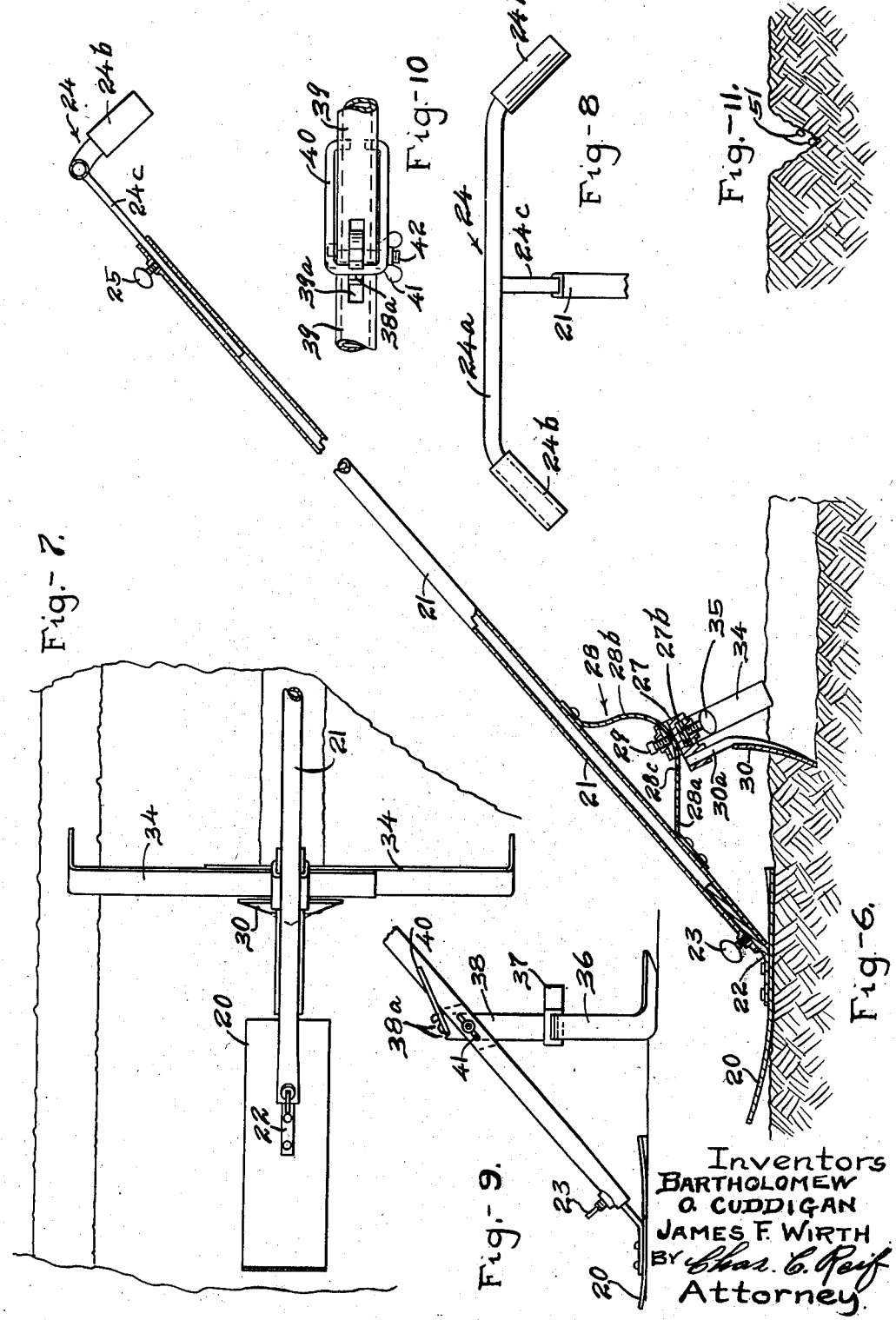

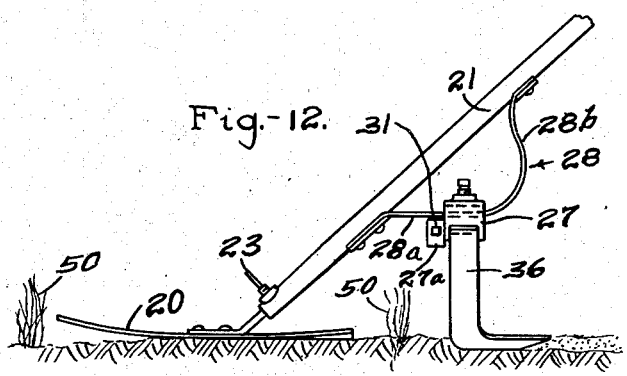
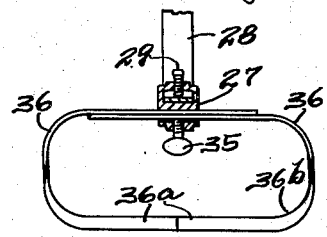
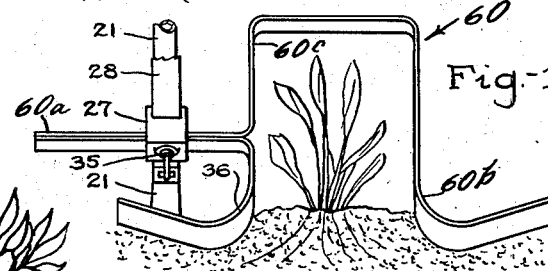
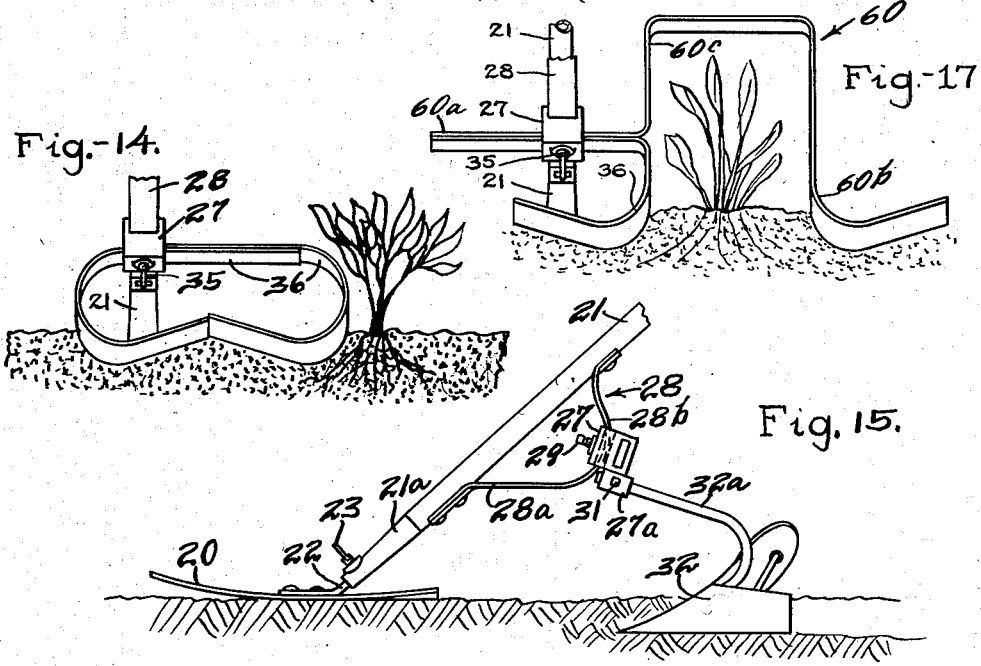
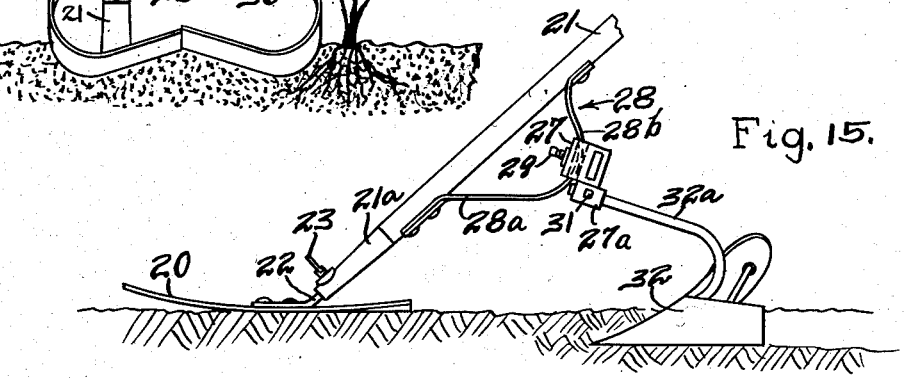
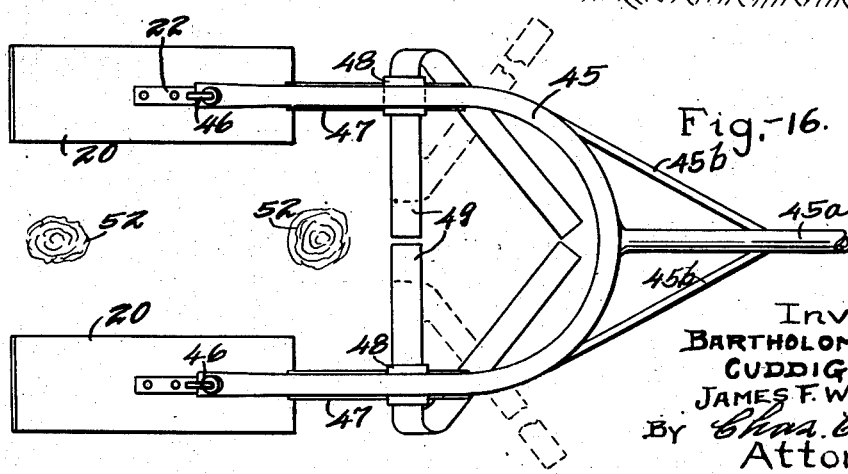

2,387,748

UNITED STATES PATENT OFFICE 2,387,748

GARDEN TOOL

Bartholomew O. Cuddigan, Wadena, and James F. Wirth, Minneapolis, Minn.

Application June 19, 1943, Serial No. 491,444

14 Claims. (Cl. 97—58)

This invention relates to a garden tool and particularly to a hand-operated garden tool.

It is an object of this invention to provide a garden tool having a shoe adapted to travel along on top of the ground, a shank secured to said shoe and extending upwardly and rearwardly, the same having a handle at its upper end adapted to be held by the operator as the tool is pushed along or moved. Said tool also comprises a holder adapted to be moved to different positions, said holder being adapted to receive a number of different operating tools, some of which may alternately be used.

It is another object of the invention to provide a tool such as set forth in the preceding paragraph, said shoe having its lower surface convex both laterally and longitudinally so that said shoe will easily travel along the ground and may be used efficiently to cover seed in a furrow and somewhat pack the dirt thereon.

It is a further object of the invention to provide such a tool as set forth in the last paragraph, save one in which a pair of blades or knives are carried in said holder and extend in opposite directions laterally therefrom, the same being bent downwardly in curved formation to have their inner end portions directed inwardly.

It is still another object of the invention to provide a garden tool having a shoe adapted to travel along on top of the ground, a shank secured to said shoe and extending upwardly and rearwardly therefrom, having a handle at its upper end, a supporting means on said shank, a tool holder movable to different positions on said supporting means, a pair of blades carried by said holder, said blades being disposed in one position of said holder so as to travel substantially parallel with the surface of the ground for weeding or light cultivation and being disposed in another position of said holder so as to travel at an angle to the surface of the ground for moving dirt laterally, said shoe being longitudinally adjustable in said shank to be moved to positions in accordance with the position of said holder.

Another object of the invention is the provision of a garden implement having a shoe adapted to travel along the surface of the ground, a shank extending upwardly and rearwardly from said shoe, a handle at the upper end of said shank adapted to be held by the operator, said handle being adjustable longitudinally in said shank to suit operators of different heights and one or more tools carried by said shank.

It is another object of the invention to provide a garden implement having a shoe adapted to travel along on top of the ground, a shank extending upwardly and rearwardly from said shoe and having a handle at its upper end, a supporting means on said shank, a head movable to different positions on said supporting means, said head being adapted to receive a shovel for making a furrow, also to receive adjustable marking devices for marking another furrow, said marking devices being adjustable in said head.

It is still further an object of the invention to provide a garden implement having a shoe adapted to travel along on top of the ground, a shank secured to said shoe and extending upwardly and rearwardly therefrom having a handle at its upper end, a supporting means carried by said shank, a head movable to different positions on said supporting means, a pair of blades carried in said head and extending in opposite directions laterally therefrom, said blades being reversely bent downwardly in curved formation to have their inner end portions directed inwardly, said blades also being movable laterally in said head to bring their ends quite close together or spaced at some distance and said blades preferably being reversible in some forms of the device so that their end portions will be directed outwardly.

These and other objects and advantages of the invention will be fully set forth in the following description made in connection with the accompanying drawings in which like reference characters refer to the same parts throughout the different views and in which:

Fig. 1 is a view in side elevation of the tool, a portion being broken away.

Fig. 2 is a partial plan view of Fig. 1.

Fig. 3 is a partial view similar to Fig. 2 showing some of the parts in different positions.

Fig. 4 is a vertical section taken on line 4—4 of Fig. 1 as indicated by the arrows.

Fig. 5 is a partial view in rear elevation of the tool shown in Fig. 6.

Fig. 6 is a view partly in side elevation and partly in central longitudinal section showing the tool equipped for opening a furrow.

Fig. 7 is a partial plan view of the tool shown in Fig. 6.

Fig. 8 is a partial view in rear elevation of the tool as shown in Fig. 6 illustrating the handles.

Fig. 9 is a partial view in side elevation showing a modified form of the implement.

Fig. 10 is a partial plan view of the structure shown in Fig. 9.

Fig. 11 is a vertical sectional view through a furrow in the ground.

Fig. 12 is a partial view in side elevation showing the implement equipped with a pair of blades or knives in position for weeding or light cultivation.

Fig. 13 is a view in rear elevation of Fig. 11.

Fig. 14 is a view similar to Fig. 12 showing the said blades in a different position and also showing a plant.

Fig. 15 is a partial view in side elevation showing the implement with a share.

Fig. 16 is a partial plan view of a modification, some parts being shown in different positions in dotted lines; and Fig. 17 is a view similar to Fig. 5 showing a modification.

Referring to the drawings a garden tool or implement is shown having a shoe 20 adapted to travel along on top of the ground. While shoe 20 could be variously made, in the embodiment of the invention illustrated, it is shown as having a bottom surface which is convex both laterally and longitudinally. Secured to the shoe 20 is a shank 21. While shoe 20 could be secured to shank 21 in various ways in the embodiment of invention illustrated, said shoe is shown as having a member or rod 22 secured thereto, the same being bent to extend upwardly at an acute angle and being receivable in a bore in the end of shank 21, which shank is shown as having a tapered end. Portion 21a at the end of the shank if made of wood may be equipped with a ferrule. While member 22 might be secured to different portions of shoe 20 it preferably is secured to said shoe at substantially the longitudinal and transverse center thereof. Member 22 can be held in different positions in shank 21 by some suitable means such as the thumb screw 23. In the operation of the implement, shank 21 extends upwardly and rearwardly and is provided at its upper end with a handle 24 adapted to be held by the operator. While the form of handle used might be varied, in the embodiment of invention illustrated, a handle of the handle bar type is shown comprising a cross piece 24a having downturned ends equipped with grip members 24b. Handle 24 has a central rod 24c and this is slidably received in a bore in the upper end of shank 21, in which it can be secured in different positions by some suitable means, such as the thumb screw 25.

A head or tool holder 27 is provided carried on shank 21 and while this could be carried on said shank in various ways in the embodiment of the invention illustrated, shank 21 has secured thereto a bar 28 which is disposed adjacent the lower end of said shank and has a portion 28a extending rearwardly at an angle to said shank and a portion 28b which is curved upwardly and then rearwardly and secured to said shank.

Bar 28 passes through head 27 and has holes or notches 28c therein at at least two places which holes or notches are adapted to receive the end of a set screw 29 and to show definite and proper positions of head or tool holder 27. When set screw 29 is tightened head 27 is held in one of said positions. Head 27 has a portion thereon which is provided with a bore which may receive the shank of various operating tools. In Fig. 6 said portion 27a has therein the shank of a shovel 30. Said shank 30a of shovel 30 is held in portion 27a by a thumb screw 31. Said screw 31 is shown in Fig. 15 in which portion 27a is shown as having therein the shank 32a of a plow share 32. In Figs. 6 and 7 head 27 is also shown as having secured therein a pair of markers or marking devices 34. Said members 34 are formed of flat bars having their ends turned down downwardly at right angles. Head 27 is provided with a slot 27b in which bars 34 are disposed in over-lapping relation. Said bars can be moved to different positions laterally and are held in the desired position by a thumb screw 35.

In Figs. 1 to 5 and 9 and 11 to 13 head 27 is shown as having therein a pair of blades or knives 36. Blades 36 extend laterally in opposite directions and are reversely bent downwardly in curved formation so that their end portions 36a are directed inwardly. Said blades or knives have sharpened front edges 36b which extend some distance in the vertical portions thereof. When head 27 is in one position as shown in Fig. 12 the portions 36a of blades 36 are positioned in substantially parallel relation with the surface of the ground. In this position as shown in Fig. 12 shoe 20 is moved outwardly some distance from the end of shank 21. In Fig. 1 head 27 is shown in another position in which the blades 36 have their end portions extending at an angle to the surface of the ground, the same inclining upwardly toward their free ends. In this position shoe 20 is in closer relation to the end of shank 21. As shown in Fig. 3 blades 36 can be moved so that their ends are substantially in contact or as shown in Fig. 2 said blades can be moved so that their ends are quite far apart.

In Figs. 9 and 10 a modification is shown in which a head 37 corresponding to head 27 already described, is carried on a bar 38 which is pivotally mounted in a slot 39a of a shank 39 corresponding to shank 21. Bar 38 has a pair of downwardly inclined open-ended slots 38a in its top, in one of which one end of a bail 40 is adapted to be disposed. Bail 40 has its rear ends pivotally mounted in the sides of shank 39. Bar 38 is held in the desired position by a thumb nut 41 threaded on a headed bolt 42 through shank 39 and bar 38. By loosening thumb nut 41 bar 38 can be swung about its pivot after bail 40 is released so that bail 40 may be disposed in the desired slot 38a. In the position shown in Fig. 9 the blades 36 are disposed as shown in Fig. 12. With bail 40 in the other notch 38a the blades would be disposed as shown in Fig. 1.

In Fig. 16 an implement is shown having two of the shoes 20. In this structure the members 22 secured to the shoes are received in bores in the ends of a yoke 45 and are adjustably held therein by thumb screws 46. A shank 45a extends from the center of yoke 45 and is reenforced or braced by the rods 45b secured to and extending therefrom to and secured to yoke 45. The two sides of yoke 45 each have secured thereto a bar 47 which is identical with the bar 28 already described. On the bars 47 are respectively positioned the heads 48 similar in all respects to head 27 already described. A pair of blades 49 similar to blades 36 are shown in the heads 48. Blades 49 could be reversed in the heads 48 and have their end portions extend outwardly as shown in dotted lines in Fig. 16. Shank 45a will of course be provided with a handle as is shank 21.

In Fig. 17 another modification of the device is shown. In this figure, which is similar to Fig. 5, the shank 21 is shown as is also the bar 28 and the head 27. These parts will be identical with the same parts already described. One of the blades 36 is used and this is placed in the slot 27b. In place of the other blade 36 a special bar or blade 60 is shown. The member 60 has a shank portion 60a which is also received in the slot 27b over the end of the blade 36. At the right of head 27 member 60 extends upwardly, laterally and downwardly in substantially rectangular form to form a yoke-like portion 60c and then is provided with a downwardly and outwardly curved portion 60b similar to blade 36. It will be seen that member 60 and blade 36 can be adjusted to bring the curved or operating portions closer together or farther apart. Member 60 and blade 36 will be held in head 27 by means of set screw 35 as already described. The shank 21 and shoe 20 will be located at one side of the curved portion of blade 36 and portion 60b in longitudinal alinement with head 27. The head 27 can be adjusted as already described to its different positions on member 28. With the structure shown in Fig. 17 the shoe can run at one side of the row and the blade 36 and the portion 60b will be disposed at opposite sides of the row.

In operation the implement will be provided with the desired operating tools and will be properly adjusted for the desired operation. If the implement is to be used for very light cultivation or mulching or for weeding, the blades 36 will be used and will be positioned as shown in Figs. 12 and 13, the end portions of the blades having the sharpened edges being disposed so that they will move substantially parallel to the surface of the ground and at a short distance below said surface. The ground will thus be cut and loosened into very fine condition and any weeds or grass 50 in the path of the blades will be severed or pulled up entirely. When the blades 36 are in the position shown in Figs. 12 and 13, the shoe 20 is adjusted outwardly some distance from the end of shank 21. It is then in the proper position to co-operate with the blades 36 in their position. The operator merely holds the handle 24 and pushes the implement along. The shoe 20 rides easily and smoothly along the top of the ground and supports the implement so as to maintain the operating tool in the desired position. The shoe functions much better in soft or sandy ground or ground which is in fine or semi-fluent condition than would a wheel. The shoe will stay nicely on top of the ground where a wheel would sink into the ground. When it is desired to cut off a row of plants such as bean vines or other plants the blades 36a can be moved so that their ends are substantially in contact and the same can then be moved directly over the row. As the blades move along they will sever the plants in the row. There is a great advantage in the reversely bent and curved formation of blades 36a. The tool can be moved along quite close to the plants and the downwardly and inwardly curved portion of the blade is directed away from the plants so that it in a sense moves parallel to the root formation as shown in Fig. 14. As shown in Fig. 14 the blades 36 need not be disposed centrally in relation to the shank but can be moved so as to be largely at one side of head 27. The blade at one side can then extend well under certain plants such as cabbage.

When it is desired to do deeper cultivating and to move the dirt laterally somewhat, the blades 36 will be positioned as shown in Fig. 1. At this time shoe 20 is positioned quite close to the end of shank 21. This causes the blades 36 to go deeper into the soil and as they move along they will not only loosen the soil and eliminate any grass or weeds, but they will have a tendency to move the dirt towards the ends of the blades. The implement can thus be used with the blades 36 only therein and these blades can be variously positioned to give the different results desired.

Shoe 20 as above described is positioned to suit the position of the blades 36 without changing the pitch or angle of shank 21.

The implement can also be used to open a furrow. This operation is shown in Figs. 6 and 7. The shovel 30 which is carried in the portion 27a moves through the ground and makes or opens a furrow such as illustrated in Fig. 11. Also at this time the markers 34 or one of them may be used and as one furrow is made, a mark is made for the operator to follow in making the next furrow. After the furrow is made the seed 51 can be deposited therein. After the seed is thus deposited the shoe 20 can be run along the furrow and it will cause enough dirt to move into the bottom of the furrow and over the seed as is usually necessary. The dirt is thus moved over the seed and the dirt is packed somewhat on the seed by shoe 20. This action is illustrated in Fig. 4. By having the shoe convexed transversely the lowest portion is at the center and this facilitates the packing action on the seed on the bottom of the furrow. The curvature of the shoe longitudinally causes it to run more easily over the surface of the ground. The front end of the shoe will not dig into the ground. It is sometimes desirable to operate the tool with a reciprocating motion with a progressively forward action so that it is desirable to have the rear end of the shoe curved upwardly somewhat. By having the shank connected to the center of the shoe a nice control of the shoe action can be had.

If it is desired to cover the seed more deeply the blades 36 can be used as illustrated in Fig. 5, said blades being positioned as shown in Fig. 1 and these blades will cause a little more dirt to be moved into the furrow and over the seed. The implement thus has a high degree of utility in planting and covering seed of many kinds.

When it is desired to hill or ridge up a row as when the final cultivation is given to potatoes, the plow share 32 can be used in holder 27 and it will throw the dirt in the desired direction. With the implement shown in Fig. 16 the shoe 20 will move at each side of the row containing the plants 52. The blades 49 in this tool can be adjusted to have their ends the desired distance from the plants or they may be brought close together to sever the plants as in harvesting beans or onions. The action of the blades 49 will be similar to that already described for blades 36. With the blades 49 reversed the blades will extend downwardly and away from the plants and a row can be cultivated simultaneously at each side.

The operation of the tool shown in Figs. 9 and 10 is the same as that of the tool illustrated in Figs. 1, 2, 8 and 11 to 14. Said Figs. 9 and 10 merely show a different structure for adjusting the position of the operating tools.

In the operation of the tool as shown in Fig. 17 the shoe 20 will run at one side of the row of plants while the blade 36 and portion 60b of member 60 will be disposed respectively at opposite sides of the row. The plants can thus be cultivated at each side simultaneously. The raised intermediate portion of member 60 is provided so that the plants can pass under the member 60. The member 60 and blade 36 will be adjusted to be at the desired distance at each side of the row of plants. They can be brought quite close to the row or if desired can be separated a greater distance. It will be understood that head 27 can be adjusted to its several positions so that the operating portions of blade 36 and member 60 will travel as shown in Figs. 9 and 12 or if desired in the position shown in Fig. 1. The structure shown in Fig. 17 therefore makes a very efficient tool for weeding or cultivating at both sides of the row and yet only one shoe is used. It will thus be seen that the tool can be used to completely weed and cultivate all parts of the garden.

From the above description it will be seen that we have provided a simple and highly efficient implement which will have a high degree of utility in giving the proper care to a garden and one which will be very efficient. The implement can be easily and quickly moved along the row of plants and can be moved quite close to the plants as the curved blades used sweep downwardly and away from the roots. The shoe 20 moves easily along the ground and is given the right pitch in its curvature for easy movement. As described the transverse curvature of the shoe gives an efficient action in covering and packing seed in a furrow. The handle 24 can be adjusted longitudinally to suit the height of the operator. This is important as the handle should be at the right height for the particular person so that the proper and desired positions of shoe 20 and the operating tool may be maintained. The various operating tools used may be easily and quickly placed in the device or removed therefrom. As stated the device can not only be used for mulching, weeding and various types of cultivation, but can also be used to cut off a row of plants of various kinds when this is desired. The device is very efficient as a weeder. The portions 36a of blades 36 move a short distance beneath the surface of the ground, working the ground into fine condition and all weeds or grass or severed or pulled up. The blades are quite sharp so that there is no tendency for the grass or weeds to hang on to or clog the tools.

The implement has been amply demonstrated in actual practice and found to be very successful and efficient.

It will, of course, be understood that various changes may be made in the form, details, arrangement and proportions of the parts, without departing from the scope of applicants' invention, which generally stated, consists in a device capable of carrying out the objects above set forth, in the parts and combinations of parts disclosed and defined in the appended claims.

What is claimed is:

1. A garden tool having in combination, a shoe having a lower surface adapted to ride on top of the ground, an elongated shank secured to said shoe and extending upwardly and rearwardly from said shoe, a handle at the upper end of said shank adapted to be held by the operator, a holder supported by said shank, means for holding said holder in different positions at different angles respectively to the longitudinal axis of said shank, a tool carried in said holder and movable laterally therein and means for holding said tool in different positions in said holder.

2. The structure set forth in claim 1 said shank being connected to said shoe substantially at the center thereof and the bottom surface of said shoe being convex both longitudinally and laterally.

3. A garden tool having in combination a shoe adapted to ride upon the top of the ground having a rearwardly and upwardly extending portion, an elongated shank secured to said portion and extending upwardly and rearwardly therefrom in longitudinal alignment with said portion, a handle at the upper end of said shank adapted to be held by the operator, a tool in the rear of said shoe movable to different positions longitudinally of said shank, said portion being adjustable to different positions longitudinally of said shank to position said shoe to correspond with and function properly with said tool in the respective positions of the latter.

4. A garden tool having in combination, a shoe adapted to ride upon the top of the ground, an elongated shank secured to said shoe and extending upwardly and rearwardly therefrom, a handle at the upper end of said shank adapted to be held by the operator, a holder adapted to receive various tools, means on said shank carrying said holder on which said holder is movable to positions making different angles with the longitudinal axis of said shank, a knife receivable in said holder extending laterally therefrom laterally movable therein and reversely curved downwardly to have its end portion extend inwardly, said end portion extending at an angle to the surface of the ground in one position of said holder and extending substantially parallel to the ground in another position of said holder and means for holding said knife in said holder in different positions.

5. A garden tool having in combination, a shoe adapted to ride upon the top of the ground, an elongated shank secured to said shoe and extending upwardly and rearwardly therefrom, a handle at the upper end of said shank adapted to be held by the operator, a holder adapted to receive various tools, said shank carrying said holder which holder is movable to operating positions making different angles with the longitudinal axis of said shank, a pair of blades with sharp forward edges disposed in said holder and extending in opposite directions therefrom, said blades being reversely curved downwardly to have their end portions extending inwardly, said blades being movable laterally to different positions in said holder and means for holding said blades in different positions in said holder whereby said blades may be positioned at different angles to the top of the ground by movement of said holder and may also be held in different positions in said holder.

6. The structure set forth in claim 5, said handle being movable to different positions in said shank to accommodate operators of different heights so that said blades can be maintained in a substantially constant relation to the top of the ground, and means for holding said handle in position.

7. A garden tool having in combination, a shoe adapted to ride upon the top of the ground, an elongated shank secured to said shoe and extending upwardly and rearwardly therefrom, a handle at the upper end of said shank adapted to be held by the operator, said shank having a supporting means thereon extending at an angle to the longitudinal axis of said shank, a head carried on said means, a tool receivable in said head, a row marking device receivable in said head, means for holding said tool in said head, means for holding said device in said head and means for holding said head stationary on said supporting means.

8. A garden tool having in combination, a shoe adapted to ride upon the top of the ground, an elongated shank secured to said shoe and extending upwardly anad rearwardly therefrom, a handle at the upper end of said shank adapted to be held by the operator, a supporting means on said shank extending at an angle to the longitudinal axis of said shank, a head carried on said means and movable to different positions on said means, a pair of knives receivable in said head and extending in opposite directions therefrom, said knives being reversely bent downwardly in curved formation to have their end portions extend inwardly, said blades being disposable in one position of said head with their end portions substantially parallel to the surface of the ground and being disposable in another position of said head with their end portions extending in an inclined relation to the surface of the ground, means for holding said blades in said head and means for holding said head in different positions on said supporting means.

9. A garden tool having in combination, a shoe adapted to ride upon the top of the ground, an elongated shank secured to said shoe and extended upwardly and rearwardly therefrom, a handle at the upper end of said shank adapted to be held by the operator, a bar secured to the under side of said shank extending at an angle thereto and spaced therefrom, a tool holder movable on said bar, means for securing said holder to said bar in different positions and in different angular relation to said shank, said holder having means for receiving one or more operating tools and means for holding said tools in said holder.

10. A garden tool having in combination, a shoe adapted to ride upon the top of the ground, an elongated shank secured to said shoe and extending upwardly and rearwardly therefrom, a handle at the upper end of said shank adapted to be held by the operator, a supporting means carried on said shank and extending at different angles to the longitudinal axis of said shank, a tool holder movable to positions on said supporting means at different angles to the longitudinal axis of said shank, a pair of blades carried in said tool holder, extending laterally therefrom and having downwardly and reversely curved end portions, said end portions extending inwardly and said blades being movable to different positions in said tool holder and means for holding said blades stationary in said tool holder whereby the angular position of said blades can be varied by movement of said tool holder and the lateral position of said blades can be varied by movement of said tool holder.

11. The structure set forth in claim 10 one of said blades having a yoke like portion extending some distance above said tool holder and adapted to pass over plants in a row.

12. A garden tool adapted to be propelled by an operator having in combination, a shoe having a lower surface adapted to ride on the top of the ground, an elongated shank secured to said shoe and extending upwardly and rearwardly from said shoe, a handle at the upper end of said shank adapted to be held by the operator, a tool carried by said shank in the rear of said shoe and arranged to travel in the ground at a certain level and at a certain angle and means for holding said handle in different positions longitudinally of said shank and thus at different heights so that operators of different heights can conveniently hold and push on said handle to propel said tool without varying the position or inclination of said tool.

13. A garden tool having in combination, a shoe adapted to ride upon the top of the ground, an elongated shank secured to said shoe and extending upwardly and rearwardly therefrom, a handle at the upper end of said shank adapted to be held by the operator, a tool holder carried on said shank some distance in the rear of said shoe, said tool holder being movable longitudinally of said shank to thus be positioned at different distances from the ground and being movable to positions at different angles to the longitudinal axis of said shank, a tool carried in said tool holder and movable to different positions therein and means for holding said tool in said tool holder.

14. A garden tool having in combination, a shoe adapted to ride upon the top of the ground, an elongated shank secured to said shoe and extending upwardly and rearwardly therefrom, a handle at the upper end of said shank adapted to be held by the operator, a tool holder carried on said shank and blades extending laterally therefrom and having downwardly and reversely curved end portions, one of said blades having a yoke-like portion extending some distance above said tool holder and adapted to pass over plants in a row, said end portions being disposed at either side of said row.

BARTHOLOMEW O. CUDDIGAN.
JAMES F. WIRTH.